T. W. BAKEWELL.
Hot Air Furnace.
No. 13,743.
Patented Nov. 6, 1855.
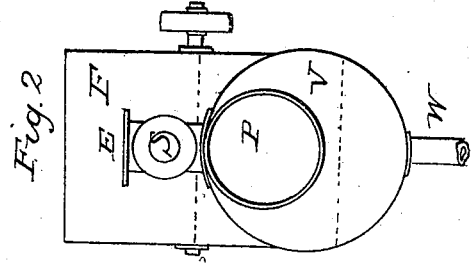
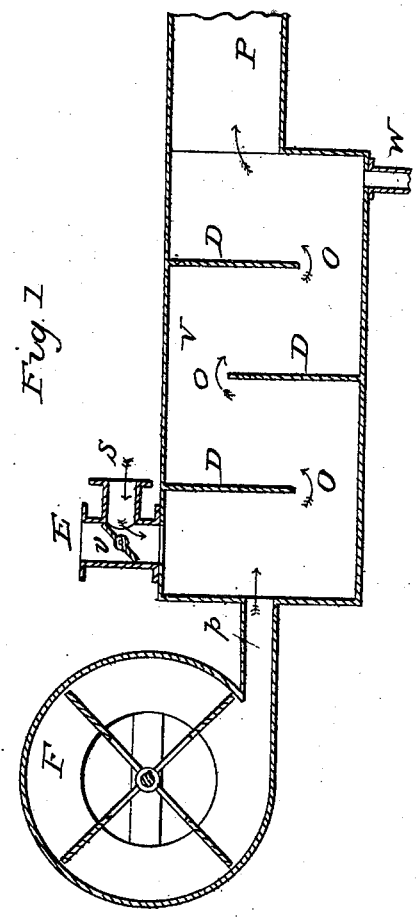

UNITED STATES PATENT OFFICE.

THOS. W. BAKEWELL, OF CINCINNATI, OHIO.

METHOD OF TREATING AIR FOR BLAST-FURNACES.

Specification of Letters Patent No. 13,743, dated November 6, 1855.

*To all whom it may concern:*

Be it known that I, THOMAS W. BAKEWELL, of the city of Cincinnati, in the county of Hamilton and State of Ohio, have invented a new and useful Improvement in the Heating of Air for the Supply of Boiler or other Furnaces to Effect Saving in Fuel; and I do hereby declare that the following is a full, clear, and exact description of the same, reference being had to the accompanying drawings, forming part of this specification, in which—

Figure 1, is a longitudinal central section of the apparatus employed to carry out my invention, and Fig. 2, a transverse section of the same.

Similar letters of reference indicate corresponding parts in both figures.

By this invention the furnace is supplied with heated air to the exclusion of the outward air.

The invention consists in heating the air by bringing it in direct contact and mixture with the escape steam from a steam engine in a vessel common to both, previously to its admission to the furnace, the air being driven into the said vessel by a fan and the resulting water of condensation being carried off to the force pump by a pipe provided for the purpose.

To enable those skilled in the art to make and use my invention, I will proceed to describe its construction and operation.

F, is the fan by which the air is driven through the passage *p*, into the vessel V, which receives the escape steam through the pipe S, the quantity of steam being regulated by a valve *v*, which is adjustable by hand or otherwise, the steam not required to to heat the air escaping by the pipe E. The air and steam pass through the vessel to the pipe P, which conveys the air under the grate of the furnace, being obstructed in the passage sufficiently to cause them to be thoroughly mixed and the air to be well heated by contact, by partial divisions D, D, D, which leave openings, O, O, O, at bottom and top alternately.

W, is the pipe by which the resulting water of condensation drains off to the force pumps, said pipe being placed at the end of the vessel nearest the pipe P, and the bottom of the vessel V, having a gradual descent toward the said pipe W, in order to facilitate the escape of the water. The air on its arrival at the furnace may or may not contain a limited quantity of uncondensed steam.

The vessel V, with its divisions D, D, D, and the pipe P, may be all constructed of sheet iron the vessel being cylindrical as represented or of other convenient form.

To give an idea of the relative dimensions of the various portions of the apparatus I will state that for the furnace of an engine of twenty (20) horse power, the fan may be forty (40) inches diameter and thirty (30) inches wide, the vessel V, thirty (30) inches diameter, and the pipe P, eighteen (18) inches diameter.

I do not claim the introduction to furnaces of heated air or steam, by itself, either separately or combined. But

What I claim as my invention and desire to secure by Letters Patent is—

The heating of air to supply furnaces, by bringing the escape steam of an engine into direct and intimate contact therewith in a suitable vessel separate from the furnace and previously to its admission thereto, substantially in the manner herein set forth.

THO. W. BAKEWELL.

Witnesses:
   JOS. GEO. MASON,
   WM. TUSCH.